United States Patent

Ederyd et al.

[11] Patent Number: 5,786,076
[45] Date of Patent: Jul. 28, 1998

[54] BINDERLESS CARBIDES FOR TRIBOLOGICAL APPLICATIONS

[75] Inventors: Stefan Ederyd, Saltsjö-Boo, Sweden; Henri Pastor, Grenoble, France

[73] Assignee: Sandvik AB, Sandviken, Sweden

[21] Appl. No.: 570,430

[22] Filed: Dec. 11, 1995

[30] Foreign Application Priority Data

Dec. 12, 1994 [SE] Sweden ................ 9404325

[51] Int. Cl.$^6$ ................ B32B 17/00
[52] U.S. Cl. ................ 428/325; 428/328; 428/698; 501/87; 501/99
[58] Field of Search ................ 501/87, 99; 508/105, 508/103, 108, 109; 428/325, 328, 698

[56] References Cited

U.S. PATENT DOCUMENTS

| | | |
|---|---|---|
| 5,278,109 | 1/1994 | Ono et al. ................ 501/87 |
| 5,334,561 | 8/1994 | Matsui et al. ................ 501/87 |
| 5,434,112 | 7/1995 | Matsui et al. ................ 501/87 |

FOREIGN PATENT DOCUMENTS

| | | |
|---|---|---|
| 2671357 | 7/1992 | France . |
| 57-13142 | 1/1982 | Japan . |
| 57-19353 | 2/1982 | Japan . |
| 57-19354 | 2/1982 | Japan . |
| 63-83236 | 4/1988 | Japan . |
| 1-55357 | 3/1989 | Japan . |

*Primary Examiner*—Timothy Speer
*Attorney, Agent, or Firm*—Burns, Doane, Swecker & Mathis, L.L.P.

[57] ABSTRACT

A corrosion resistant material contains essentially WC, and 0.1 to 10 weight-%, preferably 0.5 to 5 weight-%, of one or more of the metallic carbides TiC, VC, NbC, TaC, $Cr_3C_2$, ZrC or combinations thereof or with WC, and either spherical graphite and/or spherical hexagonal BN up to 10 volume-% with a size of about 3 μm or 1–5 weight % of one or more of VN, Ti(C,N), CrN, ZrN. In applications with sliding surfaces, it has been found that the material has surprising results regarding low friction characteristics.

10 Claims, 1 Drawing Sheet

BINDERLESS CARBIDES FOR TRIBOLOGICAL APPLICATIONS

BACKGROUND OF THE INVENTION

The present invention relates to binderless carbides with improved tribological properties.

Cemented carbide, e.g., WC—Co, WC—TiC—Co, WC—TaC—Co or WC—TiC—TaC—Co, finds many applications in the field of wear parts. This is linked to their outstanding properties, viz. a high hardness and a high toughness resulting into a high wear resistance, a low coefficient of friction and a rather high thermal conductivity.

However, in applications where these materials are brought into contact with corrosive media—particularly aqueous media—the metallic binder is corroded resulting in a progressive wear by superficial crumbling. Even by using a more corrosion resistant binder—like Ni, Ni—Mo, Ni—Cr, Ni—Mo—Cr—as a substitute for cobalt, corrosion can only be avoided to a specific pH level.

One possible solution is to use a cemented carbide without binder phase, often referred to as binderless carbides. Tungsten carbide (WC) can be sintered without any metallic binder at 1900°–2000° C. However, as a consequence of using such high sintering temperatures, grain growth occurs leading to a decrease of both hardness and toughness. Binderless cemented carbide generally contains <1 weight-% Co as a impurity from the milling operation.

JP-A-57-13142, JP-A-57-19353 and JP-A-57-19354 disclose corrosion resistant cemented carbide containing, in addition to WC, 2–5 weight-% TiC and/or TaC and 1–3 weight-% TiN.

OBJECTS AND SUMMARY OF THE INVENTION

It is an object of this invention to avoid or alleviate the problems of the prior art.

It is further an object of this invention to provide binderless carbides with improved tribological properties.

The invention provides a corrosion resistant material consisting essentially of WC, 0.1 to 10 weight% of one or more of the metallic carbides taken from the group consisting of TiC, VC, NbC, TaC, $Cr_3C_2$, ZrC and combinations thereof; and either (a) 2 to 10 volume-% of spherical graphite and spherical BN and/or hexagonal BN; or (b) 1–5 weight-% of one or more of VN, Ti(C,N), CrN, ZrN.

DETAILED DESCRIPTION OF THE PREFERRED EMBODIMENTS OF THE INVENTION

Figure 1:
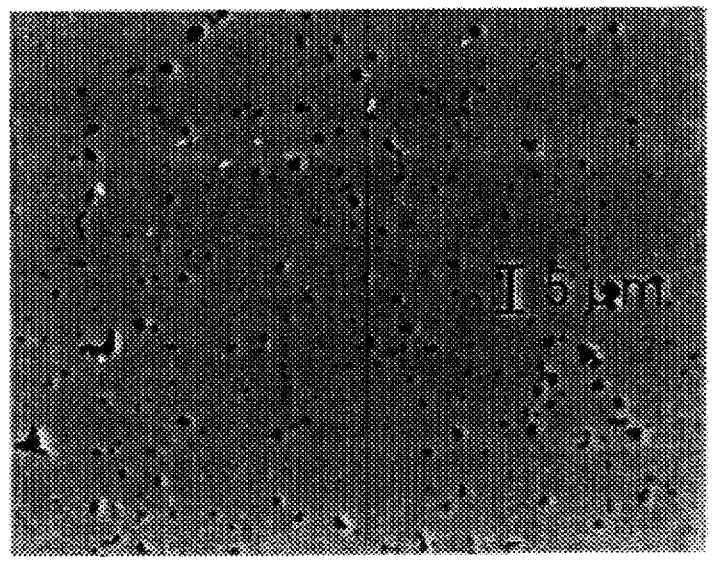
FIG. 1 shows a micrograph of a binderless material according to the invention containing spherical graphite.
Figure 2:
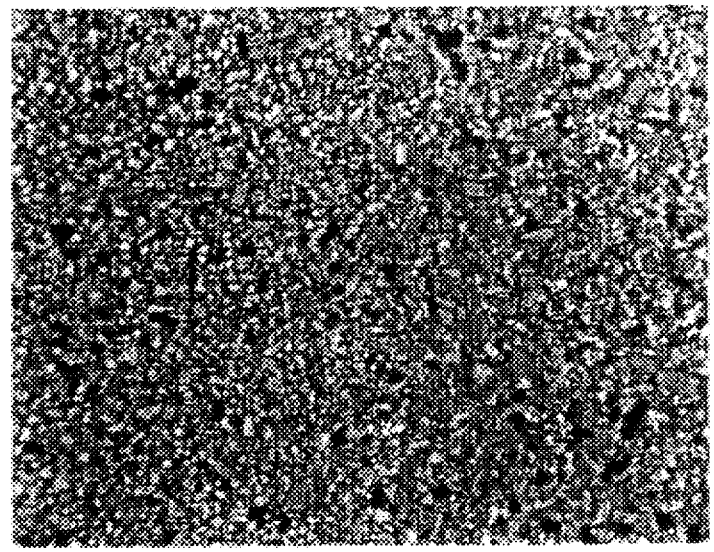
FIG. 2 shows the etched microstructure of the material in FIG. 1.

According to the presently claimed invention, it has been found that additions of 0.1 to 10 weight-%, preferably 0.5 to 5 weight-%, to WC of one or more of the metallic carbides TiC, VC, NbC, TaC, $Cr_3C_2$, ZrC or combinations thereof, and either (a) 2–10 volume % of spherical graphite or (b) spherical or hexagonal BN, of a size of 1 to about 5 µm, preferably about 3 µm, give a binderless carbide with improved properties. Alternatively, in applications with sliding surfaces, it has been found that additions in amounts of 1–5 weight-% of VN, Ti(C,N), CrN or ZrN, give surprising results regarding low friction characteristics. Addition of carbonitrides of the above nitrides also promotes the friction characteristics.

The WC grain size shall be chosen with regard to the wear application. In seal rings, the value PV is used as a factor to characterize the performance of the forces that act in the seal surface: P means the normal pressure and V, the sliding velocity.

In applications with PV values <10–15 MPa·m/s, the material shall have a WC grain size of 0.1 to 2 µm, preferably 0.3 to 1.5 µm.

In applications with PV values about 100 MPa·m/s or more, the WC grain size shall be 2–10 µm, preferably 3–8 µm.

In an alternative embodiment, a small amount up to 1.7 weight-% cobalt doped with 20 to 500 ppm B and $Mo_2S$ and/or WS up to 5 volume-% are added.

An embodiment with the composition of about 3 weight-% TiC, about 2 weight-% TaC, about 0.3 weight-% NbC with about 5 volume-% spherical graphite and rest WC has given particularly good results in corrosive media with pH value of 2 or less.

The materials according to the presently claimed invention are manufactured by the techniques of powder metallurgy.

The tungsten carbide powder (WC) has a mean Fisher grain size of 0.4 to 20 µm depending on chosen wear characteristics in the application. The metallic carbide powders MeC and the metallic nitride and/or the carbonitride powders MeN/Me(C,N) have a mean Fisher grain size between 0.8 and 5 µm, preferably between 1 and 4 µm.

The mixing of the constituents is made by milling in a mill (ball mill or attritor mill) equipped with cemented carbide balls, under ethanol or acetone, with an addition of 2 weight-% PEG (polyethyleneglycol).

The powder is granulated by spray drying, in a hot nitrogen stream, of the slurry recovered from the milling operation.

The granulated powder is compacted to the desired shape by pressing at pressures between 80 and 200 MPa.

Sintering is made at a temperature between 1450° and 1700° C., preferably 1450° and 1550° C., under vacuum or under argon and then followed by HIP treatment or sinter-HIP treatment at a temperature between 1300° and 1450° C.

In the case of B-doped cobalt, the sintering is made at a temperature between 1200° and 1250° C.

The material according to the presently claimed invention is:

highly resistant to corrosion, particularly aqueous corrosion, due to the absence of binder phase; and self lubricating when containing constituents of nitrides, carbonitrides and/or spherical graphite and/or spherical BN. These constituents give tribofilms which are necessary in both wet and dry tribological applications.

The invention is additionally illustrated in connection with the following Examples which are to be considered as illustrative of the present invention. It should be understood, however, that the invention is not limited to the specific details of the Examples.

EXAMPLE 1

A material with the composition WC—TiC 3-TaC 2-NbC 0.3 weight-% with about 5 volume-% of spherical graphite was prepared using raw materials with the following characteristics:

|  | WC | TiC | TaC | NbC |
|---|---|---|---|---|
| Mean Fisher grain size (μm) | 1.2 | 3.6 | 2.2 | 2.0 |
| Total carbon (weight %) | 6.19 | 19.70 | 6.66 | 11.4 |
| Free carbon (weight %) | 0.10 | 0.27 | 0.06 | 0.05 |

The spherical graphite that was added had a Fisher grain size of 3 μm.

The mixing was made by milling in an attritor mill, using cemented carbide balls, for 14 hours, under ethanol, adding 2 weight-% of PEG.

The slurry obtained at the end of the milling step was spray dried (NIRO atomizer) in a hot nitrogen stream. The granulated powder thus resulting had a granule size distribution between 20 and 200 μm.

The sintering was made at 1480° C., for 1 hour, under a partial pressure of 13 kPa argon and then followed by a sinter-HIP treatment at the same temperature and for the same time, but under 6 MPa argon. The material had the following characteristics:

Porosity: <A02, C08 in spherical form

Hardness: HV30=1870

No trace of corrosion was observed after 240 hours of immersion in aqueous hydrochloric acid, 0.5N, and in aqueous nitric acid, 0.8N, at 60° C.

EXAMPLE 2

The material of Example 1 was tested with regard to tribological characteristics.

The test was performed by means of a pin-on-disc test rig which is constructed in the following way. A shaft presses a flat grounded pin at an angle of 90° against the rotating ring. The load is applied by a dead weight, 30 N, and is constant during the test. The friction force is measured and recorded continuously by force transducers.

Test System:

Flat grounded pin: $R_a$=0.08

Rotating ring: $R_a$=0.07

Sliding velocity: 1 m/s

Sliding distance: 2000 m

PV: 100 MPa·m/s

Both the pin and the ring were manufactured in the same material as described in Example 1.

As a reference, a commercially available corrosion resistant material was chosen, SANDVIK C9M.

Test Results:

| | | | | Dynamic Friction | | |
|---|---|---|---|---|---|---|
| Pin | Ring | Wear | 0 min | 10 min | 20 min |
| C9M | C9M | 60 mg | 0.8 | 0.9 | 0.9 |
| Invention | Invention | 35 mg | 0.1 | 0.3 | 0.6 |

Remark: A temporarily high friction stopped the ring rotation for the conventional cemented carbide, SANDVIK C9M.

Remark: A temporarily high friction stopped the ring rotation for the conventional cemented carbide, SANDVIK C9M.

EXAMPLE 3

A material with the composition WC—$Cr_3C_2$ 0.75 - CrN 3 weight-% was prepared using raw materials with the following characteristics:

|  | WC | $Cr_3C_2$ | CrN |
|---|---|---|---|
| Mean Fisher grain size (μm) | 0.7 | 2.7 | 1.2 |
| Total carbon (weight %) | 6.12 | 13.45 | |
| Free carbon (weight %) | 0.05 | 0.10 | |

The mixing, spray drying, compression of the test pieces and sintering+sinter-HIP treatment were made as in Example 1.

Porosity: A04

Hardness: HV30=2100

No trace of corrosion was observed after 240 hours of immersion in aqueous hydrochloric acid, 0.5 N, and in aqueous nitric acid, 0.8N, at 60° C.

EXAMPLE 4

The material of Example 3 was tested with regard to tribological characteristics.

The test was performed in the same was as Example 3.

Test System:

Flat grounded pin: $R_a$=0.10

Rotating ring: $R_a$=0.08

Sliding velocity: 1 m/s

Sliding distance: 2000 m

PV: 100 MPa·m/s

Both the pin and the ring were manufactured in the same material as described in Example 3.

As a reference, a commercially available corrosion resistant material was chosen, SANDVIK C9M.

Test Results:

| | | | | Dynamic Friction | | |
|---|---|---|---|---|---|---|
| Pin | Ring | Wear | 0 min | 10 min | 20 min |
| C9M | C9M | 60 mg | 0.8 | 0.9 | 0.9 |
| Invention | Invention | 10 mg | 0.8 | 0.3 | 0.35 |

Remark: A temporarily high friction stopped the ring rotation for the conventional cemented carbide, SANDVIK C9M.

Remark: A temporarily high friction stopped the ring rotation for the conventional cemented carbide, SANDVIK C9M.

EXAMPLE 5

A material with the composition WC—ZrC 4.0—Ti(C,N) 4.0 weight-% was prepared using raw materials with the following characteristics:

|  | WC | ZrC | Ti(C,N) |
|---|---|---|---|
| Mean Fisher grain size (μm) | 0.7 | 1.7 | 1.5 |

The mixing, spray drying, compression of test pieces and sintering+ sinter-HIP treatment were made as in Example 1.
Porosity: A04.

EXAMPLE 6

The material of Example 5 was tested with regard to tribological characteristics.

The test was performed in the same way as Example 3.
Test system:
Flat grounded pin: $R_a=0.10$
Rotating ring: $R_a=0.08$
Sliding velocity: 1 m/s
Sliding distance: 2000 m
PV: 100 MPa·m/s Both the pin and the ring were manufactured in the same material as described in Example 4.

As a reference, a commercially available corrosion resistant material was chosen, SANDVIK C9M.

Test Results:

| Pin | Ring | Wear | Dynamic Friction | | |
|---|---|---|---|---|---|
| | | | 0 min | 10 min | 20 min |
| C9M | C9M | 60 mg | 0.8 | 0.9 | 0.9 |
| Invention | Invention | 20 mg | 0.2 | 0.4 | 0.45 |

Remark: A temporarily high friction stopped the ring rotation for the conventional cemented carbide, SANDVIK C9M.

Remark: A temporarily high friction stopped the ring rotation for the conventional cemented carbide, SANDVIK C9M.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A corrosion resistant material consisting essentially of WC, 0.1 to 10 weight % of one or more of the metallic carbides taken from the group consisting of TiC, VC, NbC, TaC, $Cr_3C_2$, ZrC and combinations thereof; and either (a) 2 to 10 volume-% of either (1) spherical graphite or (2) spherical BN, hexagonal BN and mixtures thereof; or (b) 1-5 weight-% of one or more selected from the group consisting of VN, Ti(C,N), CrN and ZrN.

2. The corrosion resistant material of claim 1 wherein the material consists essentially of 0.5 to 5 weight % of said metallic carbide.

3. The corrosion resistant material of claim 1 wherein the WC has a grain size of 0.1 to 2 µm.

4. The corrosion resistant material of claim 3 wherein the WC has a grain size of 0.3 to 1.5 µm.

5. The corrosion resistant material of claim 1 wherein the WC has a grain size of 2-10 µm.

6. The corrosion resistant material of claim 5 wherein the WC has a grain size of 3-8 µm.

7. The corrosion resistant material of claim 1 having a composition of about 3 weight-% TiC, about 2 weight-% TaC, about 0.3 weight-% NbC with about 5 volume-% spherical graphite, balance WC.

8. The corrosion resistant material of claim 1 wherein the spherical graphite, spherical BN and hexagonal BN have a grain size of from 1 to 5 µm.

9. The corrosion resistant material of claim 8 wherein the grain size of the spherical graphite, spherical BN and hexagonal BN is about 3 µm.

10. The corrosion resistant material of claim 1 furter containing up to 1.7 weight-% cobalt doped with 20 to 500 ppm B and one or more of $Mo_2S$ and WS up to 5 volume-%.

* * * * *